United States Patent
Lambricht et al.

(10) Patent No.: US 11,161,768 B2
(45) Date of Patent: Nov. 2, 2021

(54) GLASS SHEET HAVING A HIGH IR AND VISIBLE TRANSMISSION WITH A PLEASING SLIGHT COLOUR TO NEUTRAL COLOUR

(71) Applicant: AGC GLASS EUROPE, Louvain-la-Neuve (BE)

(72) Inventors: Thomas Lambricht, Perwez (BE); Audrey Dogimont, Sart-Dames-Avelines (BE); Aline Degand, Bleret (BE); Michel Bogaerts, Braine-le-Chateau (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 291 days.

(21) Appl. No.: 16/318,559

(22) PCT Filed: Jul. 18, 2017

(86) PCT No.: PCT/EP2017/068144
§ 371 (c)(1),
(2) Date: Jan. 17, 2019

(87) PCT Pub. No.: WO2018/015395
PCT Pub. Date: Jan. 25, 2018

(65) Prior Publication Data
US 2019/0284087 A1  Sep. 19, 2019

(30) Foreign Application Priority Data

Jul. 20, 2016 (EP) .................................... 16180331

(51) Int. Cl.
C03C 3/087 (2006.01)
C03C 4/00 (2006.01)
C03C 4/02 (2006.01)
C03C 4/10 (2006.01)

(52) U.S. Cl.
CPC ............ *C03C 3/087* (2013.01); *C03C 4/0092* (2013.01); *C03C 4/02* (2013.01); *C03C 4/10* (2013.01)

(58) Field of Classification Search
CPC ........... C03C 3/078; C03C 3/087; C03C 4/02; C03C 4/092; C03C 4/10; C03C 3/076; C03C 3/083; C03C 3/085; C03C 3/091; C03C 3/093
See application file for complete search history.

(56) References Cited

U.S. PATENT DOCUMENTS

| | | |
|---|---|---|
| 4,526,872 A | 7/1985 | Andrieu et al. |
| 2003/0114291 A1 | 6/2003 | Koyama et al. |
| 2007/0161492 A1 | 7/2007 | Smith et al. |
| 2007/0243993 A1 | 10/2007 | Heithoff et al. |
| 2010/0122728 A1 | 5/2010 | Fulton et al. |
| 2010/0255980 A1* | 10/2010 | Fulton ................. C03C 1/00 501/65 |
| 2012/0315410 A1 | 12/2012 | Heithoff et al. |
| 2014/0154440 A1* | 6/2014 | Iida .................... C03C 3/087 428/34.4 |
| 2014/0326314 A1 | 11/2014 | Dogimont et al. |
| 2015/0166401 A1* | 6/2015 | Yamamoto ........... C03C 4/02 428/410 |
| 2017/0075499 A1 | 3/2017 | Lambricht et al. |

FOREIGN PATENT DOCUMENTS

WO   WO 2015/172983 A1   11/2015
WO   WO 2016/008906 A1   1/2016

OTHER PUBLICATIONS

International Search Report dated Sep. 21, 2017, in PCT/EP2017/068144, filed Jul. 18, 2017.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

A glass sheet having a composition which comprises total iron (expressed in terms of $Fe_2O_3$) from 0.002-0.06 wt %; chromium (expressed as $Cr_2O_3$) from 3-75 ppm; and manganese (expressed as MnO) from 50-1,000 ppm. The glass sheet has a LTD4 higher than 70%. Such a glass sheet exhibits at once a high luminous transmission, an increased transmission of infrared (IR) radiation and a pleasing slight color or an almost neutral to neutral color.

16 Claims, No Drawings

GLASS SHEET HAVING A HIGH IR AND VISIBLE TRANSMISSION WITH A PLEASING SLIGHT COLOUR TO NEUTRAL COLOUR

1. FIELD OF THE INVENTION

The present invention relates to a glass sheet exhibiting a high luminous transmission, an increased transmission of infrared (IR) radiation and a pleasing slight color or an almost neutral to neutral color.

Due to its high IR transmission, the glass sheet according to the invention can thus be advantageously used in any device requiring panels more or less large in size and using a technology requiring very good transmission of infrared radiation through said panels, whether through the main faces (the optical path length then corresponds to the thickness of the sheet) or starting from their edges.

For example, the glass sheet according to the invention can advantageously be used in a touchscreen or touch panel or touchpad using the optical technology referred to as Planar Scatter Detection (PSD) or also Frustrated Total Internal Reflection (FTIR) (or any other technology using IR radiation in the sheared edge of the glass) in order to detect the position of one or more objects (for example, a finger or a stylus) on the surface of said sheet. The invention consequently also relates to the use of such a glass sheet in a device using infrared radiation propagating essentially inside said sheet.

This invention is also suitable due to its aesthetics as building glass or interior glass, like for example in furniture applications, or as automotive glass, or also as cover glass in electronic devices/displays.

2. SOLUTIONS OF THE PRIOR ART

In order to obtain high transmission in the infrared region (and in the visible region), it is known to reduce the total content of iron in the glass (expressed in terms of $Fe_2O_3$, according to the standard practice in the field), obtaining low-iron glasses. Glasses of silicates type always comprise iron as the latter is present as an impurity in the majority of the starting materials used (sand, limestone, dolomite, and the like). Iron exists in the structure of glass in the form of ferric $Fe^{3+}$ ions and ferrous $Fe^{2+}$ ions. The presence of ferric $Fe^{3+}$ ions confers, on the glass, a slight absorption of low-wavelength visible light and a stronger absorption in the near ultraviolet region (absorption band centred on 380 nm), while the presence of ferrous $Fe^{2+}$ ions (sometimes expressed as oxide FeO) results in a strong absorption in the near infrared region (broad absorption band centred on 1,050 nm). Thus, the increase in the total iron content (in both its forms) accentuates the absorption in the visible region and in the infrared region. Furthermore, a high concentration of ferrous $Fe^{2+}$ ions results in a decrease in the transmission in the infrared region (in particular, the near infrared region). However, to achieve a coefficient of absorption in the range of wavelengths from 780 to 1200 nm which is sufficiently low for the touch applications by influencing only the total iron content would require such a great decrease in this total iron content that either (i) this would result in production costs which are much too high, due to the need for very pure starting materials (which sometimes even do not exist sufficiently pure), or (ii) this would present production problems (in particular the premature wear of the furnace and/or difficulties of heating the glass in the furnace).

It is also known, in order to further increase the transmission of the glass, to oxidize the iron present in the glass, that is to say to reduce the content of ferrous ions in favor of the content of ferric ions. The degree of oxidation of a glass is given by its redox, defined as the ratio by weight of $Fe^{2+}$ atoms with respect to the total weight of the iron atoms present in the glass, Fe2+/total Fe. In an equivalent manner, the redox may also be determined by expressing the weights of ferrous iron ($Fe^{2+}$) and total iron as $Fe_2O_3$. Alternatively, the redox is also sometimes expressed as the weight ratio between ferrous iron ($Fe^{2+}$) expressed as FeO and total iron expressed as $Fe_2O_3$.

In order to reduce the redox of the glass, it is known to add an oxidizing component to the batch of starting materials. However, the majority of the known oxidants (sulfates, nitrates, and the like) have an oxidizing power which is not sufficiently strong to achieve the IR transmission values desired in particular for the touch panels application using the FTIR or PSD technology or have to be added in an excessively large amount with collateral disadvantages, such as cost, incompatibility with the production process, and the like.

Recently, it has been proposed a very attractive and effective solution to render a low-iron glass sheet highly transmissive to infrared radiation while keeping as much as possible its high luminous transmission. Hence, glass sheets with compositions comprising a low total iron content (from 0.002 to 0.06 wt % in $Fe_2O_3$) and chromium in a content ranging from 0.0001 to 0.06 wt % in $Cr_2O_3$ are disclosed notably in international patent applications WO2014128016A1, WO2014180679A1, WO2015011040A1, WO2015011041A1, WO2015011042A1, WO2015011043A1 and WO2015011044A1. Such glass sheets display high luminous transmission and especially high IR transmission (compared to classical low-iron glass sheets from the state-of-the-art without chromium).

However, this last solution, even if very effective in term of IR transmission, is not really satisfactory in term of color rendering. Indeed, the resulting chromium-containing glass sheets show a yellowish-greenish tint, which is more pronounced if the thickness of the sheet increases and/or if one looks through the edges of the sheet (because of the elongated view path). Such glass sheets have typically a color defined, in terms of CIELab values, by a negative a* and a positive b*.

Even if slightly yellowish-greenish colored glass (or with significantly colored edges) are acceptable for some applications, there may be aesthetic issues for other applications.

This issue has already been partially solved by producing a more bluish to neutral color in those chromium-containing glasses. Hence, WO2015091106 discloses that adding cobalt in a chromium-containing glass composition leads to a color characterized by a slightly negative a* and a slightly positive b*.

However, in order to improve the undesired yellowish-greenish tint of known IR transmissive chromium-containing glass sheets, there is still an interest to dispose of other solutions allowing to approach or reach neutrality or to reach other tones than the bluish tone (i.e. warm-tone or red-tone) but still close to neutrality. In particular, by "warm tone" herein (including notably wood-tone, honey-tone), it is meant a color which is defined by positive coordinates in a*b* system or, in other words, a color which lies in the first dial of the a*b* diagram.

Neutrality of a glass sheet (and consequently of its edges) is generally evaluated through its vicinity to the illuminant (0;0 coordinate in a*b* system) and in particular, it is quantified by a "N factor" defined as:

$N=\sqrt{a^{*2}+b^{*2}}$, which has to be lowered as much as possible to approach and reach neutrality.

3. OBJECTIVES OF THE INVENTION

The objective of the invention, in at least one of its embodiments, is to provide a glass sheet with a high luminous transmission, a high transmission of infrared radiation and a pleasing slight color or an almost neutral to neutral color. In particular, it is an objective of the invention to provide such a glass sheet with a high transmission of near infrared radiation, in particular in the range of wavelengths from 780 to 1200 nm.

Another objective of the invention is to provide a glass sheet with a high luminous transmission, a high transmission of infrared radiation and a pleasing slight color or an almost neutral to neutral color, which is easy and inexpensive to produce.

4. DETAILED DESCRIPTION OF THE INVENTION

The invention relates to a glass sheet having a composition which comprises:
total iron (expressed in terms of $Fe_2O_3$): 0.002-0.06 wt %
chromium (expressed as $Cr_2O_3$): 3-75 ppm
manganese (expressed as MnO): 50-1,000 ppm,
and having a LTD4 higher than 70%.

Thus, the invention is based on a novel and inventive approach as it allows to solve the technical problem posed. Indeed, the inventors have surprisingly demonstrated that it is possible, by combining in a low-iron glass composition chromium and manganese within specific ranges of contents, to obtain a glass sheet which show a very good compromise between high transparency in the visible region, high transparency in the near-IR region, and pleasing slight/neutral color. In particular, the inventors have demonstrated that, by adding manganese in certain amounts in a chromium-containing glass composition, it is possible, without perorating significantly the luminous transmission, to "neutralize" the a* component of the initial color of the glass (shifting it towards a less negative value, zero or even a slightly positive value), while allowing to decrease the chromium content required to reach a given level of IR transmission in comparison with situation where chromium is not in the presence of manganese. Such a decrease of the required chromium content to a reach a given high IR transmission is very advantageous as this already leads to a decrease of the induced yellow-green tint to reach same performance in IR transmission. Moreover, manganese also acts in a positive manner on the IR transmission, even if slighter than for chromium.

Other features and advantages of the invention will be made clearer from reading the following description of preferred embodiments, given by way of simple illustrative and non-restrictive examples.

Throughout the present text, when a range is indicated, the extremities are included, except if explicitly described in another way. In addition, all the integral and subdomain values in the numerical range are expressly included as if explicitly written. Moreover, throughout the present text also, values of content in percentages are by weight (also mentioned as wt %) expressed with respect to the total weight of the glass. Finally, when a glass composition is given, this relates to the bulk composition of the glass.

In present description and claims, to evaluate the color of a glass sheet (and thus its edges), one considers CIELab values: a* and b*, measured for a sheet thickness of 5 mm, in transmission with illuminant D65, 10°, SCI.

In present description and claims, to quantify the luminous transmission of a glass sheet, one considers the total light transmission with illuminant D65 (LTD) for a sheet thickness of 4 mm (LTD4) at a solid angle of observation of 2° (according to standard 1509050). The light transmission represents the percentage of light flux emitted between wavelengths 380 nm and 780 nm which is transmitted through the glass sheet.

The glass sheet according to the invention may have varied and relatively large sizes. It can, for example, have sizes ranging up to 3.21 m×6 m or 3.21 m×5.50 m or 3.21 m×5.10 m or 3.21 m×4.50 m ("PLF" glass sheet) or also, for example, 3.21 m×2.55 m or 3.21 m×2.25 m ("DLF" glass sheet).

The glass sheet according to the invention can have a thickness of from 0.1 and 30 mm. Advantageously, in the case of the touch panels application, the glass sheet according to the invention can have a thickness of from 0.1 and 6 mm. Preferably, in the case of the touchscreens application, for reasons of weight, the thickness of the glass sheet according to the invention is of from 0.1 to 2.2 mm. Alternatively, preferably, for any application other than the screen application, essentially for reasons of mechanical strength, the thickness of the glass sheet according to the invention is from 4 to 12 mm.

Preferably, the glass of the invention is completely amorphous material, thereby excluding any crystalline material, even partially crystalline material (such as, for example, glass-crystalline or glass-ceramic materials).

The glass sheet according to the invention can be a glass sheet obtained by a floating process, a drawing process, a rolling process or any other process known to manufacture a glass sheet starting from a molten glass composition. According to a preferred embodiment according to the invention, the glass sheet is a float glass sheet. The term "float glass sheet" is understood to mean a glass sheet formed by the float glass process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin).

The glass sheet according to the invention is made of glass which may belong to various categories. The glass can thus be a glass of soda-lime-silica, aluminosilicate or borosilicate type, and the like. Preferably, the composition of the glass sheet comprises the following in weight percentage, expressed with respect to the total weight of glass:

| | |
|---|---|
| $SiO_2$ | 40-78% |
| $Al_2O_3$ | 0-18% |
| $B_2O_3$ | 0-18% |
| $Na_2O$ | 0-20% |
| CaO | 0-15% |
| MgO | 0-10% |

| | |
|---|---|
| K$_2$O | 0-10% |
| BaO | 0-5%. |

More preferably, notably for low production costs reasons, the glass composition is a soda-lime-silicate-type glass. According to this embodiment, by "soda-lime-silicate-type glass", it is meant that the base glass matrix of the composition comprises the following in weight percentage, expressed with respect to the total weight of glass:

| | |
|---|---|
| SiO$_2$ | 60-78 wt % |
| Al$_2$O$_3$ | 0-8 wt % |
| B$_2$O$_3$ | 0-4 wt % |
| CaO | 0-15 wt % |
| MgO | 0-10 wt % |
| Na$_2$O | 5-20 wt % |
| K$_2$O | 0-10 wt % |
| BaO | 0-5 wt %. |

According to this embodiment, preferably, the base glass matrix of the composition comprises the following in weight percentage, expressed with respect to the total weight of glass:

| | |
|---|---|
| SiO$_2$ | 60-78 wt % |
| Al$_2$O$_3$ | 0-6 wt % |
| B$_2$O$_3$ | 0-1 wt % |
| CaO | 5-15 wt % |
| MgO | 0-8 wt % |
| Na$_2$O | 10-20 wt % |
| K$_2$O | 0-10 wt % |
| BaO | 0-1 wt %. |

In a preferred embodiment of the invention, the composition comprises the following in weight percentage, expressed with respect to the total weight of glass:

$65 \leq SiO_2 \leq 78$ wt%

$5 \leq Na_2O \leq 20$ wt%

$0 \leq K_2O < 5$ wt%

$1 \leq Al_2O_3 < 6$ wt%

$0 \leq CaO < 4.5$ wt%

$4 \leq MgO \leq 12$ wt%

$(MgO/(MgO+CaO)) \geq 0.5$.

In another preferred embodiment of the invention, the composition comprises the following in weight percentage, expressed with respect to the total weight of glass:

$65 \leq SiO_2 \leq 78\%$ $5 \leq Na_2O \leq 20\%$ $0 \leq K_2O < 5\%$ $3 < Al_2O_3 \leq 5\%$ $0 < CaO < 4.5\%$ $4 \leq MgO \leq 12\%$;

$0.88 \leq [MgO/(MgO+CaO)] < 1$.

In another preferred embodiment of the invention, the composition comprises the following in weight percentage, expressed with respect to the total weight of glass:

$60 \leq SiO_2 \leq 78\%$ $5 \leq Na_2O \leq 20\%$ $0.9 < K_2O \leq 12\%$ $4.9 \leq Al_2O_3 \leq 8\%$ $0.4 < CaO < 2\%$ $4 < MgO \leq 12\%$.

In another preferred embodiment of the invention, the composition comprises the following in weight percentage, expressed with respect to the total weight of glass:

$65 \leq SiO_2 \leq 78$ wt%

$5 \leq Na_2O \leq 20$ wt%

$1 \leq K_2O < 8$ wt%

$1 \leq Al_2O_3 < 6$ wt%

$2 \leq CaO < 10$ wt%

$0 \leq MgO \leq 8$ wt%

$K_2O/(K_2O+Na_2O): 0.1-0.7$.

In particular, examples of base glass matrixes for the composition according to the invention are described published PCT patent applications WO2015/150,207A1 and WO2015/150,403A1, in filed PCT patent applications WO2016/091,672 A1 and WO2016/169,823A1, and in EP patent application n°16176447.7.

According to the invention, the composition of the invention comprises total iron (expressed in terms of Fe$_2$O$_3$) as follows: 0.002-0.06 wt %. In present description, when talking about total iron content in glass composition, "total iron" and "Fe$_2$O$_3$" are used as well. According to an embodiment, the composition comprises total iron $\geq 0.004$ wt %. Preferably, the composition comprises total iron $\geq 0.005$ wt %. More preferably, the composition comprises total iron $\geq 0.006$ wt % or even, $\geq 0.007$ wt %. The minimum values make possible not to excessively damage the cost of the glass as such low iron values often require expensive, very pure, starting materials and also their purification. According to an embodiment, the composition comprises total iron $\leq 0.04$ wt %. Preferably, the composition comprises total iron $\leq 0.03$ wt %. More preferably, the composition comprises total iron $\leq 0.02$ wt % or even, $\leq 0.015$ wt % or even better, $\leq 0.01$ wt %. The decreasing of maximum value in total iron allows to reach higher and higher values of luminous transmission. To avoid any doubt herein, each embodiment concerning lower limits in total iron is of course combinable independently with any possible embodiment concerning higher limits.

Preferably, according to the invention, the composition comprises an Fe$^{2+}$ content (expressed in the form of FeO) of less than 20 ppm. This range of contents makes it possible to obtain highly satisfactory properties, in particular in terms of transmission of the IR radiation. Preferably, the composition comprises an Fe$^{2+}$ content (expressed in the form of FeO) of less than 10 ppm. Very preferably, the composition comprises an Fe$^{2+}$ content (expressed in the form of FeO) of less than 5 ppm.

According to the invention, the composition comprises chromium (expressed as $Cr_2O_3$) as follows: 3-75 ppm and manganese (expressed as MnO) as follows: 50-1,000 ppm.

Preferably, the composition comprises MnO≥70 ppm. More preferably, the composition comprises MnO≥100 ppm or even, ≥150 ppm or even better, MnO≥200 ppm. These minimum values allow to reach the desired target in color. This also has a positive effect on the IR transmission. Finally, this also allows to take into account the reduced general impact of manganese in industrial conditions (furnace).

Preferably, the composition comprises MnO≤900 ppm. More preferably, the composition comprises MnO≤800 ppm or even, ≤700 ppm or even better, ≤600 ppm. Even more preferably, the composition comprises MnO≤500 ppm or even, ≤400 ppm These decreasing maximum values allow to keep a high luminous transmission and avoid as much as possible the solarisation phenomenon.

To avoid any doubt herein, each embodiment concerning lower limits in MnO is of course combinable independently with any possible embodiment concerning higher limits.

Preferably, the composition comprises $Cr_2O_3$≥5 ppm. More preferably, the composition comprises $Cr_2O_3$≥10 ppm or even, ≥15 ppm. These minimum values allow to reach the target in color in combination with manganese, and also to reach a high IR transmission.

Preferably, the composition comprises $Cr_2O_3$≤50 ppm. More preferably, the composition comprises $Cr_2O_3$≤40 ppm or even, ≤25 ppm. These decreasing maximum values allow to keep a high luminous transmission while more easily reaching the desired color.

To avoid any doubt herein, each embodiment concerning lower limits in $Cr_2O_3$ is of course combinable independently with any possible embodiment concerning higher limits.

According to an embodiment of the invention, the composition comprises: $Cr_2O_3 = -0.04*MnO + (Fe_2O_3/100)*x$; x being between 15 and 30 and $Cr_2O_3$, MnO and $Fe_2O_3$ being expressed in ppm. This allows to reach a high luminous transmission and a high IR transmission. Alternatively, the composition comprises: $Cr_2O_3 = -0.02*MnO + (Fe_2O_3/100)*x$ x being between 15 and 30 and $Cr_2O_3$, MnO and $Fe_2O_3$ being expressed in ppm. This allows to reach a high luminous transmission and a high IR transmission, while also taking into account the reduced general impact of manganese in industrial conditions (furnace).

According to a particularly advantageous embodiment, the composition may also comprises cobalt in order to still better adapt the final color of the glass sheet, in particular to "neutralize" the b* component of the color of the glass sheet, thereby still more approaching neutrality.

According to the invention, the glass sheet has a high luminous transmission and in particular, it has a LTD4 (LTD for a sheet thickness of 4 mm) higher than 70%. Preferably, the glass sheet according to the invention has a LTD4 higher than 75%, 80%, 85%, 86%, 87%, 88%, 89%, or even higher than 90%, or better higher than 90.5%, 90.75% or even more better higher than 91%.

Preferably, the glass sheet is characterized by: N≤2; ≤1.5; ≤1; ≤0.75; ≤0.5; or even ≤0.2. These embodiments allow to approach more and more the neutrality.

The glass sheet according to the invention can advantageously be used in any device requiring panels more or less large in size and using a technology requiring (i) high transmission of infrared radiation through said panels, whether through the main faces or starting from their sheared edge, and (ii) high transmission in the visible region, and also a pleasing neutral to slight coloration. For example, the glass sheet of the invention can advantageously be used in any technology using IR radiation propagating in the sheared edge of the glass. In particular, the sheet can be enhanceable in value in the "Planar Scatter Detection" (PSD) or also "Frustrated Total Internal Reflection" (FTIR) optical technology for detecting the position of one or more objects (for example, a finger or a stylus) on a surface of said sheet. Moreover, due to its high transmission in the visible region and its pleasing neutral to slight coloration, the glass sheet according to the invention can advantageously be used as touch surface, in particular fitted above a display surface.

According to the invention, the glass sheet has a high transmission of IR radiation. More specifically, the glass sheet of the present invention has a high transmission of radiation in the near infrared region.

In order to quantify the high transmission of the glass in the near infrared region, in the present description, use will be made of the coefficients of absorption at the wavelengths of 1,050, 950 and 850 nm, which consequently must be as low as possible in order to obtain high transmission. The coefficient of absorption is defined by the ratio of the absorbance to the length of the optical path traveled by electromagnetic radiation in a given medium. It is expressed in $m^{-1}$. It is thus independent of the thickness of the material but it is a function of the wavelength of the radiation absorbed and of the chemical nature of the material.

In the case of glass, the coefficient of absorption (μ) at a chosen wavelength λ can be calculated from a measurement of transmission (T) and from the refractive index n of the material, the values of n, ρ and T being a function of the chosen wavelength λ:

$$\mu = -\frac{1}{thick} \cdot \ln\left[\frac{-(1-\rho)^2 + \sqrt{(1-\rho)^4 + 4\cdot T^2 \cdot \rho^2}}{2\cdot T \cdot \rho^2}\right]$$

with $\rho = (n-1)^2/(n+1)^2$

According to the invention, the glass sheet has a coefficient of absorption at the wavelengths of 1,050, 950 and 850 nm which is lower than that of an "extra-clear" low iron glass of the state of the art (reaching for example, ~6.5 $m^{-1}$ at 1,050 nm).

Advantageously, the glass sheet according to the invention has a coefficient of absorption at the wavelength of 1,050 nm of less than 5 $m^{-1}$. Preferably, it has a coefficient of absorption at the wavelength of 1,050 nm of less than or equal to 2 $m^{-1}$. Very preferably, it has a coefficient of absorption at the wavelength of 1,050 nm of less than or equal to 1 $m^{-1}$.

Advantageously again, the glass sheet according to the invention has a coefficient of absorption at the wavelength of 950 nm of less than 5 $m^{-1}$. Preferably, it has a coefficient of absorption at the wavelength of 950 nm of less than or equal to 2 $m^{-1}$. Very preferably, it has a coefficient of absorption at the wavelength of 950 nm of less than or equal to 1 $m^{-1}$.

Advantageously again, the glass sheet according to the invention has a coefficient of absorption at the wavelength of 850 nm of less than 5 $m^{-1}$. Preferably, it has a coefficient of absorption at the wavelength of 850 nm of less than or equal to 2 $m^{-1}$. Very preferably, it has a coefficient of absorption at the wavelength of 850 nm of less than or equal to 1 $m^{-1}$.

In order to quantify the compromise according to the invention between reaching a high luminous transmission, a high transmission of infrared radiation and a pleasing slight or neutral color, one can use the Q factor, defined as follows:

$$Q^2 = a^{*2} + b^{*2} + \mu^2 + \left(1 - \frac{LTD4}{100}\right)^2$$

To obtain the best compromise between high luminous transmission, high transmission of infrared radiation and neutrality, the value of Q factor should be as low as possible. In particular, according to the invention: Q≤5 and preferably, Q≤4; ≤3 or even ≤2. In a most preferred embodiment, Q≤1.

The composition of the glass sheet can comprise, in addition to the impurities present in particular in the starting materials, a low proportion of additives (such as agents which help the melting or the refining of the glass) or of components originating from the dissolution of the refractories constituting the melting furnaces.

Advantageously, the glass sheet of the invention may be tempered, mechanically or chemically. It may also be bended/curved, or in a general manner, deformed to reach any desired configuration (by cold-bending, thermoforming, . . . ). It may also be laminated.

According to an embodiment of the invention, the glass sheet is coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga.

According to another advantageous embodiment of the invention, the glass sheet is coated with at least one antireflection layer. This embodiment is obviously advantageous in the case of use of the glass sheet of the invention as front face of a screen. An antireflection layer according to the invention can, for example, be a layer based on porous silica having a low refractive index or it can be composed of several layers (stack), in particular a stack of layers of dielectric material alternating layers having low and high refractive indexes and terminating in a layer having a low refractive index.

According to another embodiment, the glass sheet is coated with at least one anti-fingerprint layer or has been treated so as to reduce or prevent fingerprints from registering. This embodiment is also advantageous in the case of use of the glass sheet of the invention as front face of a touchscreen. Such a layer or such a treatment can be combined with a transparent and electrically conducting thin layer deposited on the opposite face. Such a layer can be combined with an antireflection layer deposited on the same face, the anti-fingerprint layer being on the outside of the stack and thus covering the antireflection layer.

According to still another embodiment, the glass sheet is coated with at least one layer or has been treated so as to reduce or prevent glaring and/or sparkling. This embodiment is of course advantageous in the case of use of the glass sheet of the invention as front face of a display device. Such an anti-glare or anti-sparkling treatment is for example an acid-etching producing a specific roughness of the treated face of the glass sheet.

According to still another embodiment, the glass sheet has been treated so as to gain antibacterial properties (i.e. through a known silver treatment). Such a treatment is also advantageous in the case of use of the glass sheet of the invention as front face of a display device.

According to still another embodiment, the glass sheet is coated with at least one paint layer including enamel, organic paint, lacquer, . . . . This paint layer may advantageously be colored or white. According to this embodiment, the glass sheet may be coated on at least one face in its entire surface or only partially.

According to the applications and/or properties desired, other layer(s)/treatment(s) can be deposited/done on one and/or the other face of the glass sheet according to the invention.

The examples which follow illustrate the invention without the intention of limiting its coverage in any way.

EXAMPLES

Various soda-lime silica glass sheets according to the invention were prepared with variable amounts of iron, chromium and manganese, in a classical soda-lime base glass matrix (Sets #1-2) and in an adapted soda-lime glass matrix with higher alumina content (Set #3).

For the preparation of the samples according to the invention, the starting materials were mixed in the powder form and placed in a crucible for the melting, according to a pre-defined base glass matrix to which were added starting materials comprising chromium, manganese and iron in variable amounts as a function of the contents targeted in the final composition (it should be noted that the iron is already, at least in part, present in the starting materials of the base composition as impurity).

The following base glass matrix was used for Sets #1-2:

| Component | [weight %] |
|---|---|
| CaO | 9 |
| $K_2O$ | 0.015 |
| $Na_2O$ | 14 |
| $SO_3$ | 0.3 |
| $TiO_2$ | 0.015 |
| $Al_2O_3$ | 0.7 |
| MgO | 4.5 |
| $SiO_2$ | amount to reach 100% |

The following base glass matrix was used for Set #3:

| Component | [weight %] |
|---|---|
| CaO | 1 |
| $K_2O$ | 1 |
| $Na_2O$ | 16 |
| $SO_3$ | 0.3 |
| $TiO_2$ | 0.02 |
| $Al_2O_3$ | 5.9 |
| MgO | 9.6 |
| $SiO_2$ | amount to reach 100% |

The $SiO_2$ amount in glass samples was adapted depending on the amounts of total iron, $Cr_2O_3$ and MnO, in order to reach 100% in weight total.

The optical properties of each glass sheet according to the invention and comparative, from Sets #1-3, were determined on a Perkin Elmer Lambda 950 spectrophotometer equipped with an integrating sphere with a diameter of 150 mm, and in particular:
  measurements in transmission were carried out (wavelengths from 290 to 1750 nm). The coefficients of absorption ($\mu$) at the wavelength of 1,050 nm were calculated starting from these measurements in transmission;
  the light transmission LTD4 was also determined at a solid angle of observation of 2° (illuminant D65);

the CIE L*a*b* parameters were determined in transmission with the following measurement parameters: illuminant D65, 10°, thickness 5 mm.

Compositions and optical properties measured for glass sheets according to the invention ("INV") and comparative ("COMP") are shown in Table 1 for Set #1, Table 2 for Set #2 and Table 3 for Set #3.

pleasing slight to neutral color (very low N). This very good balance/compromise between reaching a high luminous transmission, a high transmission of infrared radiation and a pleasing slight or neutral color is shown by low values of Q factors for examples according to the invention, compared to their respective comparative examples.

TABLE 1

| Set#1 | EX1 Comp | EX2 Comp | EX3 Comp | EX4 INV | EX5 INV | EX6 INV | EX7 INV | EX8 INV | EX9 INV | EX10 INV | EX11 Comp |
|---|---|---|---|---|---|---|---|---|---|---|---|
| $Fe_2O_3$ (wt %) | 0.0239 | 0.0234 | 0.0114 | 0.0104 | 0.0246 | 0.0107 | 0.0105 | 0.0103 | 0.0102 | 0.0101 | 0.0112 |
| $Cr_2O_3$ (ppm) | 0 | 0 | 40 | 5 | 48 | 9 | 14 | 19 | 6 | 21 | 27 |
| MnO (ppm) | 78 | 75 | 3895 | 210 | 332 | 300 | 254 | 82 | 297 | 80 | 0 |
| $Fe^{2+}$ as FeO (ppm) | 33 | 27 | not determined | 2 | 1 | 0 | 0 | 0 | 0 | 0 | 0 |
| Absorption coefficient at 1050 nm ($m^{-1}$) | 7.30 | 6.12 | 2.32 | 0.64 | 0.44 | 0.33 | 0.17 | 0.15 | 0.13 | 0.07 | 0.07 |
| LTD4 (%, D65, 2°) | 91.36 | 91.41 | 39.91 | 91.14 | 86.34 | 90.27 | 88.25 | 88.95 | 89.64 | 88.88 | 90.57 |
| a* (D65, 10°) | −0.28 | −0.25 | 21.08 | −0.16 | 0.25 | 0.11 | 0.74 | 0.32 | 0.42 | 0.37 | −0.63 |
| b* (D65, 10°) | 0.27 | 0.29 | 3.70 | 0.57 | 1.63 | 0.70 | 0.87 | 0.97 | 0.67 | 0.96 | 1.41 |
| N | 0.39 | 0.38 | 21.40 | 0.59 | 1.65 | 0.71 | 1.14 | 1.02 | 0.79 | 1.03 | 1.54 |
| Q | 7.31 | 6.13 | 21.54 | 0.88 | 1.71 | 0.79 | 1.16 | 1.04 | 0.81 | 1.04 | 1.55 |

TABLE 2

| Set#2 | EX12 INV | EX13 INV | EX14 INV | EX15 INV | EX16 INV | EX17 INV | EX18 INV | EX19 INV | EX20 INV | EX21 INV |
|---|---|---|---|---|---|---|---|---|---|---|
| $Fe_2O_3$ (wt %) | 0.0106 | 0.0106 | 0.0101 | 0.0224 | 0.0225 | 0.0237 | 0.0222 | 0.0225 | 0.0221 | 0.0223 |
| $Cr_2O_3$ (ppm) | 7 | 24 | 11 | 12 | 22 | 48 | 46 | 48 | 14 | 21 |
| MnO (ppm) | 181 | 205 | 466 | 207 | 208 | 208 | 516 | 619 | 614 | 823 |
| $Fe^{2+}$ as FeO (ppm) | 15 | 0 | 2 | 19 | 0 | 4 | 1 | 1 | 8 | 1 |
| Absorption coefficient at 1050 nm ($m^{-1}$) | 1.55 | 0.22 | 0.60 | 4.53 | 3.27 | 1.1 | 0.40 | 0.42 | 1.89 | 0.52 |
| LTD4 (%, D65, 2°) | 91.28 | 89.88 | 90.13 | 91.09 | 90.90 | 90.20 | 86.30 | 88.40 | 90.80 | 88.60 |
| a* (D65, 10°) | −0.26 | −0.06 | 0.03 | −0.40 | −0.55 | −0.85 | 0.5 | 0.76 | −0.3 | 0.31 |
| b* (D65, 10°) | 0.68 | 0.82 | 0.65 | 0.57 | 0.80 | 1.35 | 1.44 | 1.43 | 0.71 | 0.98 |
| N | 0.73 | 0.82 | 0.65 | 0.70 | 0.97 | 1.60 | 1.52 | 1.62 | 0.78 | 01.03 |
| Q | 1.71 | 0.86 | 0.89 | 4.58 | 3.41 | 1.94 | 1.58 | 1.68 | 2.05 | 1.16 |

TABLE 3

| Set#3 | EX22 Comp | EX23 INV | EX24 INV | EX25 INV | EX26 Comp | EX27 INV |
|---|---|---|---|---|---|---|
| $Fe_2O_3$ (wt %) | 0.015 | 0.015 | 0.015 | 0.015 | 0.028 | 0.027 |
| $Cr_2O_3$ (ppm) | 0 | 30 | 27 | 22 | 0 | 47 |
| MnO (ppm) | 15 | 129 | 128 | 272 | 15 | 368 |
| $Fe^{2+}$ as FeO (ppm) | 20.5 | 8.2 | 4.4 | 1.6 | 31.0 | 1.6 |
| Absorption coefficient at 1050 nm ($m^{-1}$) | 4.83 | 2.10 | 1.46 | 0.69 | 7.14 | 0.69 |
| LTD4 (%, D65, 2°) | 91.02 | 90.62 | 90.76 | 90.52 | 90.94 | 88.85 |
| a* (D65, 10°) | 0.01 | −0.24 | −0.16 | −0.06 | −0.07 | −0.31 |
| b* (D65, 10°) | 0.02 | 0.53 | 0.44 | 0.47 | 0.03 | 1.26 |
| N | 0.02 | 0.58 | 0.47 | 0.47 | 0.08 | 1.30 |
| Q | 4.83 | 2.18 | 1.53 | 0.84 | 7.14 | 1.47 |

Those results shows that combining, in a low-iron glass matrix, a specific chromium and manganese content according to the invention allows to reach the objective of the invention, namely getting a glass sheet which, at once, is highly transparent in the IR region (absorption coefficient µ very low), is highly transparent in the visible region (TLD4>86% and up to ~91.3%) and has an aesthetically The results also show that the invention allows to clearly improve the color of the known IR-transmissive chromium-containing glass, by "neutralizing" the a* component of the initial color of the glass (shifting it towards a less negative value, zero or even a slightly positive value), Finally, those results also show that the invention allows to decrease the chromium content required to reach a given level of IR transmission in comparison with situation where chromium is not in presence of manganese (See EX10 and 11). Such a decrease of the required chromium content to reach a given high IR transmission is very advantageous as this already leads to a decrease of the induced yellow-green tint to reach same performance in IR transmission.

The invention claimed is:

1. A glass sheet having a composition comprising the following in weight percentage, expressed with respect to the total weight of the glass:
   $SiO_2$ 40-78%;
   $Al_2O_3$ 0-18%;
   $B_2O_3$ 0-18%;
   $Na_2O$ 0-20%;
   CaO 0-15%;
   MgO 0-12%;
   $K_2O$ 0-12%;
   BaO 0-5%;
   total iron (expressed in terms of $Fe_2O_3$) 0.002-0.06 wt-%;
   chromium (expressed as $Cr_2O_3$) 3-75 ppm; and
   manganese (expressed as MnO) 50-1,000 ppm,
   wherein the glass sheet has a LTD4 higher than 70% and has a coefficient of absorption at a wavelength of 1,050 nm of less than 5 $m^{-1}$.

2. The glass sheet according to claim 1, wherein the composition comprises: total iron 0.002-0.04 wt %.

3. The glass sheet according to claim 1, wherein the composition comprises: total iron 0.002-0.02 wt %.

4. The glass sheet according to claim 1, wherein the composition comprises an $Fe^{2+}$ content (expressed in the form of FeO) of less than 20 ppm.

5. The glass sheet according to claim 1, wherein the composition comprises an $Fe^{2+}$ content (expressed in the form of FeO) of less than 5 ppm.

6. The glass sheet according to claim 1, wherein the composition comprises: MnO≤800 ppm.

7. The glass sheet according to claim 1, wherein the composition comprises: $Cr_2O_3$=−0.02*MnO+($Fe_2O_3$/100)*x; x being between 15 and 30 and $Cr_2O_3$, MnO and $Fe_2O_3$ being expressed in ppm.

8. The glass sheet according to claim 1, wherein the composition comprises: $Cr_2O_3$=0.02*MnO+($Fe_2O_3$/100)*x; x being between 15 and 30 and $Cr_2O_3$, MnO and $Fe_2O_3$ being expressed in ppm.

9. The glass sheet according to claim 1, wherein the glass sheet has a LTD4 higher than 80%.

10. The glass sheet according to claim 1, wherein the glass sheet has a LTD4 higher than 85%.

11. The glass sheet according to claim 1, wherein the glass sheet has a coefficient of absorption at the wavelength of 1,050 nm of less than 2 $m^{-1}$.

12. The glass sheet according to claim 1, wherein the glass sheet has a Q factor value of Q≤5.

13. The glass sheet according to claim 1, wherein the glass sheet has a Q factor value of Q≤4.

14. The glass sheet according to claim 1, wherein the glass sheet has a Q factor value of Q≤3.

15. A glass sheet having a composition comprising the following in weight percentage, expressed with respect to the total weight of the glass:
   $SiO_2$ 40-78%;
   $Al_2O_3$ 0-18%;
   $B_2O_3$ 0-18%;
   $Na_2O$ 0-20%;
   CaO 0-15%;
   MgO 0-12%;
   $K_2O$ 0-12%;
   BaO 0-5%;
   total iron (expressed in terms of $Fe_2O_3$) 0.002-0.06 wt-%;
   chromium (expressed as $Cr_2O_3$) 3-75 ppm; and
   manganese (expressed as MnO) 50-1,000 ppm,
   wherein the glass sheet has a LTD4 higher than 70% and has a coefficient of absorption at a wavelength of 950 nm of less than 5 $m^{-1}$.

16. A glass sheet having a composition comprising the following in weight percentage, expressed with respect to the total weight of the glass:
   $SiO_2$ 40-78%;
   $Al_2O_3$ 0-18%;
   $B_2O_3$ 0-18%;
   $Na_2O$ 0-20%;
   CaO 0-15;
   MgO 0-12%;
   $K_2O$ 0-12%;
   BaO 0-5%;
   total iron (expressed in terms of $Fe_2O_3$) 0.002-0.06 wt-%;
   chromium (expressed as $Cr_2O_3$) 3-75 ppm; and
   manganese (expressed as MnO) 50-1,000 ppm,
   wherein the glass sheet has a LTD4 higher than 70% and has a coefficient of absorption at a wavelength of 850 nm of less than 5 $m^{-1}$.

* * * * *